United States Patent [19]

Mastuzaki et al.

[11] 4,177,138
[45] Dec. 4, 1979

[54] DIALYSIS METHOD AND APPARATUS THEREFOR

[75] Inventors: Harumi Mastuzaki, Hitachi; Katsuya Ebara, Mito; Sankichi Takahashi, Hitachi, all of Japan

[73] Assignees: Hitachi Plant Engineering & Construction Co., Ltd.; Hitachi, Ltd., both of Tokyo, Japan

[21] Appl. No.: 800,970

[22] Filed: May 26, 1977

[30] Foreign Application Priority Data

May 26, 1976 [JP] Japan .................................. 51-60162

[51] Int. Cl.² ...................... B01D 13/02; B01D 13/00
[52] U.S. Cl. ............................... 210/22 C; 204/180 P; 210/22 D; 210/81; 210/410
[58] Field of Search ................. 210/321 R, 321 A, 22, 210/404, 410, 81, 199; 204/180 P, DIG. 3, 301

[56] References Cited

U.S. PATENT DOCUMENTS

| | | |
|---|---|---|
| 3,079,348 | 2/1963 | Boettner ........................ 204/DIG. 2 |
| 3,341,441 | 9/1967 | Giuffrida et al. ................ 204/180 P |
| 3,496,081 | 2/1970 | Scheder ............................ 204/180 P |
| 3,767,548 | 10/1973 | Okada et al. ...................... 204/301 X |
| 3,870,613 | 3/1975 | Nakamura et al. ................ 204/180 P |
| 3,912,624 | 10/1975 | Jennings .......................... 210/409 X |

*Primary Examiner*—Frank A. Spear, Jr.
*Attorney, Agent, or Firm*—Thomas E. Beall, Jr.

[57] ABSTRACT

Dialysis apparatus has dilution and concentration chambers arranged alternately, which chambers each are defined by ion exchange membranes and frames each disposed therebetween. Passages for introduction of air into the dilution and concentration chambers are provided at lower portions thereof. The air introduced through the passages into the dilution and concentration chambers rises upward between the ion exchange membranes and is exhausted from upper portions thereof out of the dialysis apparatus. By the introduction of the air, solutions in the dilution and concentration chambers are driven to flow upward. Condensed phosphates are added to liquid to be treated before dialysis of the liquid.

6 Claims, 11 Drawing Figures 4,177,138

DIALYSIS METHOD AND APPARATUS THEREFOR

BACKGROUND OF THE INVENTION

The present invention relates to a dialysis method and apparatus therefor, particularly to improvement of a dialysis method and apparatus of the filter press type in which diffusion dialysis or electrodialysis of waste water or solutions carried out by using ion exchange membranes.

Dialysis apparatus of this kind are widely used for concentration of sea water, removing salts from saline water, and treating salt-containing waste water. In the dialysis apparatus of the filter press type, cation exchange membranes and anion exchange membranes are arranged alternately, frame members each are disposed therebetween, and all of them are clamped as in the case of a filter press to maintain a water-tight state therebetween, so that dilution chambers and concentration chambers are defined alternately in the interiors of the frame members. In order to reduce electric resistance of liquid between adjacent ion exchange membranes and maintain the electric current efficiency at a high level, it is preferred that the space between two adjacent membranes be as small as possible, and in now available apparatus, the membrane space is adjusted to 0.5 mm to 2 mm.

When a liquid containing large quantities of suspended substances, such as waste water and sea water, is dialyzed by use of such a conventional dialysis apparatus, scale-forming substances such as suspended substances and gypsum are deposited and accumulated on membrane surfaces or spacers, which spacers are disposed between the membranes for prevention of contacts of them, to cause such troubles as contamination of membranes and clogging in the dialysis chambers, liquid supply holes, and liquid discharge holes. As a result, the operation becomes often impossible to continue, and membrane life is shortened, therefore, it is desired that contamination and clogging be prevented effectively and economically.

SUMMARY OF THE INVENTION

An object of the present invention is to provide a dialysis method and apparatus in which contamination of ion exchange membranes and clogging of various passages for liquid to be treated including the ion exchange membranes are prevented effectively and economically.

Another object of the present invention is to provide a dialysis method and apparatus in which preliminary treatments of liquid to be treated in the dialysis apparatus are simplified or omitted.

Further another object of the present invention is to provide a dialysis method and apparatus in which liquids containing suspended solids and the like can be dialyzed effectively without occurrence of troubles by the membrane contamination and clogging of the passages.

A feature of the present invention is that in a dialysis apparatus comprising ion exchange membranes, frame members, the ion exchange membranes and frame members being alternately arranged with respect to each other to define dilution chambers and concentration chambers alternately, passage means for supplying a liquid to be treated into the dilution and concentration chambers, and passage means for discharging the liquid in the dilution and concentration chambers out of the same chambers, means for prevention of contamination and clogging in the ion exchange membranes and passages is provided.

The prevention of contamination and clogging are carried out by aerating means for introducing air into at least the dilution chambers of the two kinds of the chambers from lower portions of the dilution chambers and exhausting the air out of the same chambers, and under some conditions, effectively carried out by addition of a condensed phosphate into the liquid, in addition to aeration due to the aerating means.

DESCRIPTION OF THE PREFERRED EMBODIMENTS

An embodiment of dialysis apparatus according to the present invention will be described hereinafter referring to FIGS. 1, 2 and 3.

Figure 1:
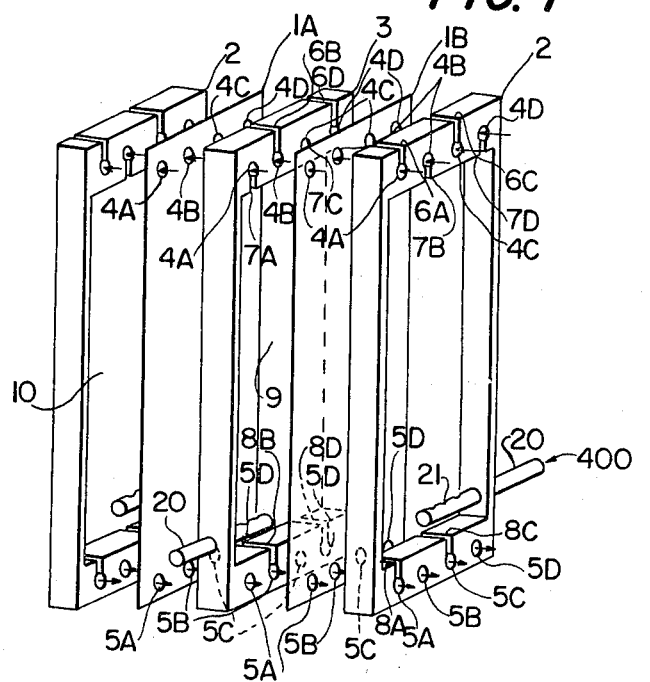
FIG. 1 is a developed perspective view showing an embodiment of dialysis apparatus according to the present invention.

In FIG. 1 which is a developped perspective view of the dialysis apparatus, there are illustrated two kinds of ion exchange membranes 1A, 1B, frame members 2, 3, and aerating means comprising aerating pipes 20 with aerating holes 21. The ion exchange membranes 1A, 1B each having liquid flow-out holes 4A, 4B, 4C, 4D made at the upper portions thereof, and solution supply holes 5A, 5B, 5C, 5D made at the lower portions thereof. The frame members 2, 3 are preferably from synthetic resin, rubber or the like, and also have liquid flow-out holes 4A, 4B, 4C, 4D and solution supply holes 5A, 5B, 5C, 5D each of which is made corresponding to one of the ion exchange membranes 1A, 1B. The liquid flow-out holes 4A 4B, 4C, 4D each communicate with the interiors and outsides of the frame members 2, 3 through grooves 7A, 7B, 7C, 7D and air vents 6A, 6B, 6C, 6D as shown in FIG. 2. Further the frame members 2, 3 each have grooves 8A, 8C and grooves 8B, 8C, respectively, which grooves are made for communication between the solution supply holes 5A, 5B, 5C, 5D. The aerating pipes each are fixed to the sides of the frame members 2, 3 so that the aerating holes 21 are disposed in the interiors of the frame members 2, 3. The ion exchange membranes 1A, 1B and frame members 2, 3 are arranged alternatively, and clamped together by bolt means as shown in FIG. 3 or hydraulic means to maintain a water-tight state between adjacent ion exchange membranes 1A and 1B and frame members 2 or 3 so that dilution chambers 9 and concentration chambers 10 are defined alternately.

Figure 2:
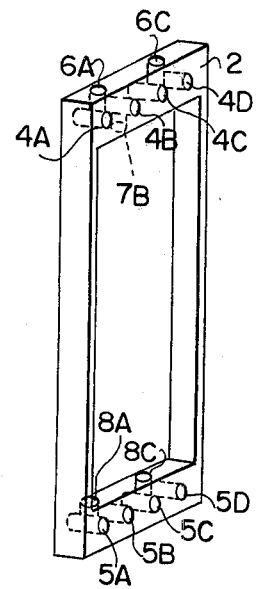
FIG. 2 is a perspective view showing a modification of a frame member used in FIG. 1.

The air vents 6 the grooves 7A, 7B, 7C, 7D and 8A, 8B, 8C, 8C in FIG. 1 may be hole-shaped ones shown in FIG. 2.

Figure 3:
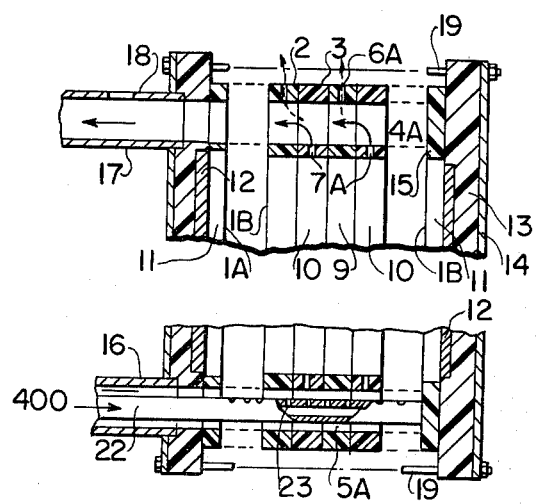
FIG. 3 is a sectional view of another embodiment of the dialysis apparatus according to the present invention.

In case that the dialysis apparatus of FIG. 1 is used as an electrodialysis, on both sides of the dialysis apparatus electrolytic solution chambers 11 with electrodes 11, 12 are provided as shown in FIG. 3. In FIG. 3 the electrolytic solution chambers 11 each are defined by the ion exchange membranes 1B, 1A, a frame member 15, and a side plate 13 of synthetic resin. They, together with the ion exchange membranes 1B, 1A, and frame members 2, 3, are clamped by bolts 19 through backing plates 14 of steel disposed outside of the side plates 13 for reinforcement. The side plate 13 has the electrode 11 fitted in the sideface of the side plate 13 so that the electrode 11 is disposed in the electrolytic solution of the electrolytic solution chamber 11. DC voltage is supplied to the electrodes 12.

The solution supply holes 5A communicate with a supply conduit 16 connected to the side plate 13 so that a solution to be treated may be supplied to the solution supply holes 5A. The other holes 5B, 5C, 5C also communicate with the similar conduits (not shown).

Aerating tubes 22 with a plurality of air holes 23 each are disposed in the conduits 16 and solution supply holes 5A (5B, 5C, 5D are not shown) so that air in the aerating tubes 22 is fed to the dilution and concentration chambers 9, 10 through the air holes 23.

The flow-out holes 4A, 4B, 4C, 4D communicate with flow-out conduits 17 with air vent holes 18 which are provided corresponding to the flow-out holes 4A, 4B, 4C, 4D (only one flow-out conduit corresponding to the flow-out hole 4A is shown). The flow-out conduit 17 may be connected with the supply conduit 16 so that the solution may be circulated. In the embodiment shown in FIG. 3, the same ion exchange membranes 1A, 1B as ones in FIG. 1, and the same frame members 2, 3 as in FIG. 2 are used.

In the dialysis apparatus shown in FIG. 1 or 3, a solution to be treated is flown into the dilution chambers 9 through the solution supply holes 5B, 5D and the grooves 8B, 8D disposed in the lower portion of the frame members 3, and in the dilution chambers 9, salts are caused to migrate selectively into adjacent concentration chambers 10 through the ion exchange membranes 1A, 1B (in general, cation exchange and anion exchange membranes). The diluted or desalted solution is flown out from the upper portions of the frame members 3 through the grooves 7A, 7C and liquid flow-out holes 4A, 4C. Air introduced into the dilution chambers 9 through the aerating tubes 20 or 22 becomes air bubbles and are released from the air vents 6A, 6C. In the concentration chambers 10, the concentrated solution is supplied from the solution supply holes 5A, 5C disposed in the lower portion of the frame member 2 and is combined with the concentrated solution which has passed through the ion exchange membranes 1A, 1B, and the combined concentrated solution arrives at the upper portion of the frame member 2 and passes through the concentrated liquid flow-out holes 4B. A part of the concentrated solution is recycled and introduced from the lower portion of the frame member 2 in the above-mentioned manner and the remainder is recovered as the concentrated solution. In general, discharge of the diluted and concentrated solutions from the dialysis system is performed by overflowing from the solution flow-out holes 4.

In the above-mentioned dialysis treatment, aerating air 400 is blown into the dialysis chambers 9, 10 (dilution and concentration chambers) from each aerating tube 20 or 22 and while air rises in these chambers, it removes contaminants and scales deposite on the membranes 1A, 1B and frame members 2, 3, whereby occurrence of troubles by contamination of the membrane surfaces can be effectively prevented and the membrane life can be remarkably prolonged.

In the present invention, aerating tubes 20 or 22 may be disposed in either or both of the dilution and concentration chambers 9, 10, For the reasons set forth hereinafter, it is preferred that these aerating tubes 20 or 22 be disposed in both the dilution chambers 9 and the concentration chambers 10 as in the above-mentioned embodiment.

The influences of the above-mentioned embodiment.

The influences of the above-mentioned aeration on the current density in the electrodialysis apparatus will now be described.

In the electrodialysis apparatus of the embodiment shown in FIG. 1 or 3, two concentration chambers 10 and three dilution chambers 9 were formed and the membrane space was adjusted to 7 mm, and a solution containing 2000 ppm of gypsum was electrically dialyzed and influences of aeration on the current density were examined to obtain results shown in the following Table. Each value of the current density in the Table is one determined at the start of the treatment where the applied voltage was 20V. The aeration rate was 0.675 l/min in each chamber 9, 10 and the liquid flow rate was made lower than the flow rate adopted in the case where aeration was not conducted.

Table

| Aeration Condition | Current Density (A/dm$^2$) | Change Ratio (%) |
|---|---|---|
| not aerated | 0.392 | 0 |
| aerated in concentration chambers 10 | 0.375 | −4.34 |
| aerated in dilution chambers 9 | 0.500 | +27.6 |
| aerated in both chambers | 0.469 | +19.6 |

From the above results, it will readily be understood that good results are obtained when aeration is conducted in the dilution chambers 9 or in both the dilution chambers 9 and the concentration chambers 10 and the current density is increased by 27.6% or 19.6%, respectively over the current density attainable when aeration is not effected. It is believed that such effect will probably be attained because non-uniform distribution of the concentration of the solution in the dilution chambers 9 is prevented by aeration.

According to the above-illustrated embodiment, a solution can be directly introduced into dialysis chambers 9, 10 for the dialysis treatment without performing such preliminary treatments of the solution as flocculation, precipitation and filtration, and occurrence of such troubles as contamination of membranes 1A, 1B, subsequent degradation of the membranes 1A, 1B, and clogging of dialysis chambers 9, 10 and solution supply and flow-out holes 5, 4 can be effectively prevented. Further, even if the membranes space is broadened, since the current density is enhanced by aeration, reduction of the current efficiency caused by broadening of the membrane space can be compensated to some extent. Moreover, even if reduction of the current efficiency by broadening of the membrane space is covered by increase of the electric power consumption, since the cost of the electric power for the dialysis treatment is 2 to 3% of the total cost of the dialysis apparatus proper, increase of the cost resulting from increase of the electric power consumption is very small. For example, even if the membrane space is increased three times, the increase of the cost of the electric power is only about 3% or less of the total treatment cost inclusive of the cost of preliminary treatments of waste water, and if the preliminary treatments are simplified by broadening of the membrane space, about 70 to 75% of the total treatment cost required in the conventional method can be saved. Therefore, the treatment cost required in the present invention can be reduced to about ⅓ of the total treatment cost required in the conventional method.

As will be apparent from the foregoing illustration, in the present invention, by broadening the membrane space, increasing the thickness of frame members 2, 3 and disposing aerating means in the lower portions of the frame members 2, 3, contamination of membranes 1A, 1B and deposition of scales in dialysis chambers 9, 10 can be effectively prevented.

Figure 4:
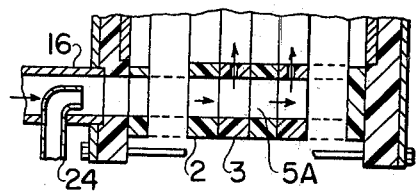
FIG. 4 is a sectional view of modification of the embodiment shown in FIG. 3.

Another embodiment of the present invention is illustrated in FIG. 4. In FIG. 4, only aerating tubes 24 differ from the ones in FIG. 3 in that only the end of the aerating tube 24 is disposed in the supply conduit 16, so that the solution containing air introduced from the aerating tube 24 is fed to dialysis chambers 9, 10 to bubble therein.

Figure 5:
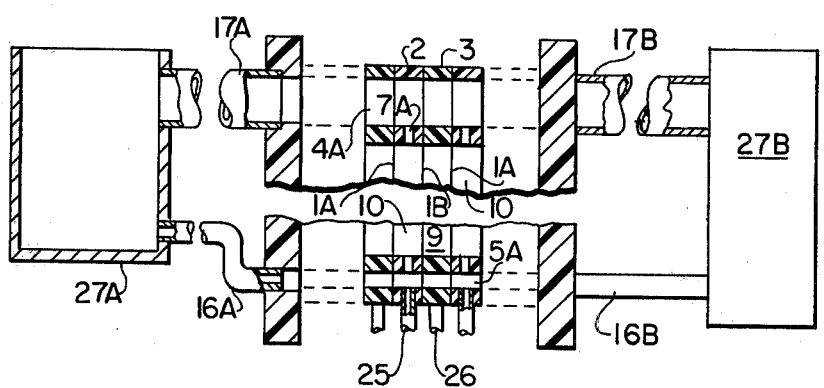
FIG. 5 is a sectional view of still further embodiment of the dialysis apparatus according to the present invention.

Further, another embodiment of the present invention is illustrated in FIG. 5. In FIG. 5, aerating tubes 25, 26 are inserted in holes made in lower portions of the frame members and water-tightly secured thereto so that the aerating tube 25, 26 communicate with the solution supply holes 5A, 5B, 5C, 5D.

The solution supply hole 5A is water-tightly connected to a tank 27A for concentration solution through a conduit 16A, and the flow-out hole 4A also is water-tightly connected to the tank 27A through conduit 17A. The dialysis apparatus has also another tank 27B for dilution solution which is connected to solution supply hole 5B, and flow-out holes 4B through conduits 16B and 17B in the same manner as in the case of the tank 27A.

When the solution level is maintained as shown in FIG. 5 (that is, at a level such that the solution level is placed in the flow-out hole 4A,) and air from the aerating pipes 25, 26 is introduced into the solution of the dilution and concentration chambers 9, 10, then by decreased apparent specific gravity of the solution in the dilution or concentration chambers 9, 10 due to the presence of the bubbles and by the inertia of the air bubbles, the solution to be treated rises in the chamber 9, 10, whereby the solution flows to the tank 27A, through the flow-out holes 4A, through the conduit 17A, from the tank 27A to the lower portions of the chambers 9, 10, through the conduit 16A, and through solution supply holes 5A. Thus, the solution is recirculated.

The aerating pipes 25, 26 are connected to a proper compressor (not shown) to supply compressed air. By the introduction of air from the aerating tubes 25, 26, recirculation of the solution can be effected without use of any pump. The recirculation of the solution is lower at an average transfer speed than by use of a pump, but transfer speed of the solution relative to the surface of the membranes 1A, 1B is larger than by the use of the pump because eddy currents of the solution by the air are brought about.

The transfer of the solution by air introduced into the dilution and concentration chambers 2, 3 is effected also in the dialysis apparatus in FIG. 1, FIG. 3 or FIG. 4.

In order to further raise effect of the membrane face contamination prevention due to bubbling, it is preferred to add condensed phosphates in a solution when the solution contains salts such as $CaSO_4$, $CaCO_3$ and $CaF_2$ which are difficult to dissolve. The $CaSO_4$, $CaCO_3$, etc., are dissolved in the starting solution since their amount is less than the limit due to their solubility, but they are condensed to be above their solubility and therefore precipitate as scale on the membrane surfaces. The condensed phosphate has an effect to mask $Ca^{2+}$ and prevent production of salts such as $CaSO_4$, $CaCO_3$.

However, when the dialysis apparatus is run for a long time, the condensed phosphates dissolved in water are hydrolyzed, lose the masking effect and have defect to precipitate metal salts of phosphoric acid on the membrane faces through the reaction of produced orthophosphoric acid ions and metal ions, whereby the membranes are weakend and clogging of the dialysis apparatus occurs so as to become unable to run.

In the condensed phosphates, there are included polyphosphates, metaphosphates and high polymers $(NaPO_3)_n$ such as Graham's salts. Generally, all of phosphates are denoted by mol ratio (hereinafter called R) of general formulas $M_2O$ and $P_2O_5$ (M: alkaline metal), and classified by the ratio R, namely, R=3: orthophosphate, 2>R>1: polyphosphate, R=1: metaphosphate 1>R>0: superphosphate, R=0: phosphorus pentoxide.

Figure 6:
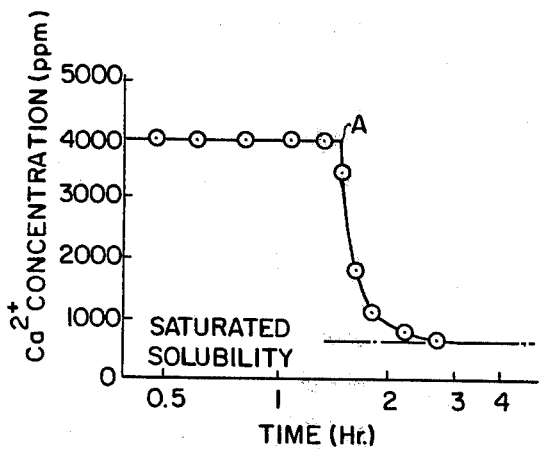
FIG. 6 is a graph showing a relation between $Ca^{2+}$ concentration and time.
Figure 7:
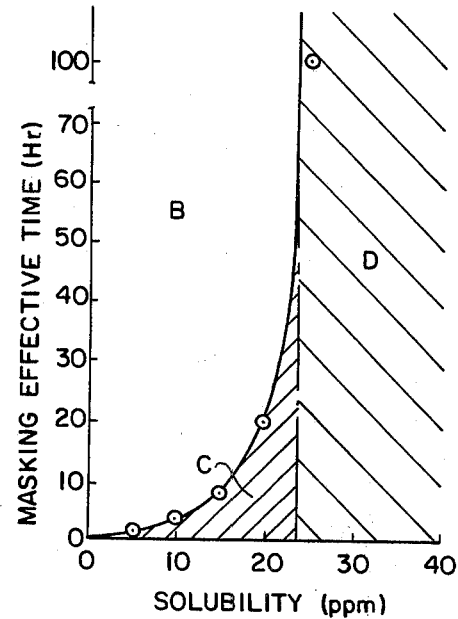
FIG. 7 is a graph showing a relation between masking effective time and solubility (ppm)

In FIG. 6 is shown an experimental result on calcium masking effect of the hexametaphosphate in a $CaSO_4$ solution. That is, there is shown an agoing change of dissolved Ca concentration when the hexametaphosphate of several ppm is dissolved in the solution including both $CaCl_2$ of 0.1 mol concentration and $Na_2SO_4$ of the same concentration, at a predetermined temperature, agitated and left as it is. First, the Ca is masked by the hexametaphosphate not to produce $CaSO_4$, but after a certain time, the masking effect is weakened so that Ca combines with $SO_4$ to precipitate $CaSO_4$, whereby $Ca^{2+}$ is decreased to below 650 ppm of $CaSO_4$ solubility. It appears that the masking effect is lost by hydrolysis of the hexametaphosphate, because presence of the phosphates such as $CaHPO_4$ and $CaSO_4.2H_2O$ is found as the result of X-ray analysis of the precipitations. Assuming that effective time of the masking is a time corresponding to the point A of FIG. 6 wherein $Ca^{2+}$ concentration starts to abruptly lower, experimental results of the relation between added hexametaphosphate concentration and the effective time is shown by FIG. 7. The effective time is raised abruptly up to a certain concentration of the hexametaphosphate, and in the region beyond the concentration, the hydrolysis is little effected, so that the hexametaphosphate seems to maintain the masking effect. The above-mentioned concentration is that of the condensed phosphate itself, not influenced by the concentrations of $Ca^{2+}$ and $SO_4^{2-}$, and kept at about a constant value of 23.0–25.0 ppm. The FIG. 7 can be divided into three regions, that is, a region B in which the masking can not effected, a region C in which the masking is temporarily effected, and a region D in which the masking effect is forever maintained. In the region C, the masking effect of the $Ca^{2+}$ is lost after a certain time, and $CaSO_4$ is precipitated. In the region D, the masking effect of $Ca^{2+}$ can be maintained, even if a relatively long time has passed. According to the present invention, the condensed phosphate is added into a solution to be treated so that its concentration falls into the region C or D and then the solution is introduced in the dialysis apparatus. In the region C, even if the hydrolysis of the condensed phosphate is conducted, the masking effect can be maintained for a long time by adding new condensed phosphate. The addition of the condensed phosphate is necessary to be done in the concentration solution, and if the condensed phosphate of large particles is combined with the desalted solution, ionized condensed phosphate is caught by fine holes of the ion exchange membrane when they pass through or migrate, so that the fine holes are clogged to cause an obstacle of electric current increase.

Figure 11:
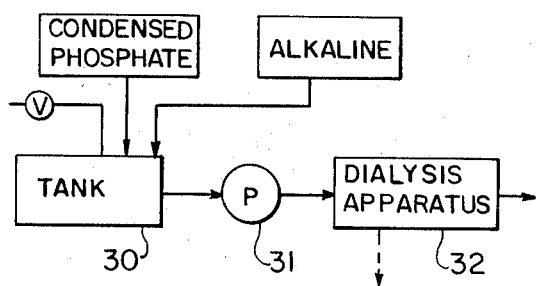
FIG. 11 is a schematic diagram showing an embodiment of the dialysis apparatus according to the present invention.

In FIG. 11, a flow chart of treatment of a waste water or solution according to the present invention is shown. The waste water or solution is introduced into a tank 30 in which the condensed phosphate is dissolved such that the concentration of the condensed phosphate falls into the forever masking region D as shown in FIG. 7, and then introduced by pump means 31, into the dialyzed apparatus in which the waste water or solution separates into permeated water (desalted water) and condensed water.

Figure 8:
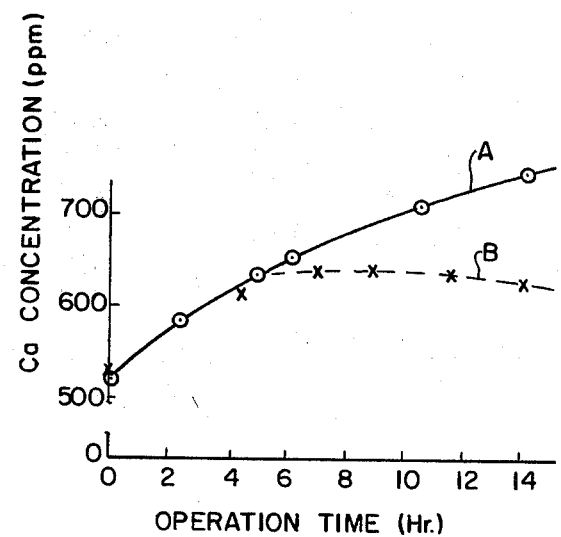
FIG. 8 is a graph showing a relation of $Ca^{2+}$ concentration to operation time.

In FIG. 8 shown are relations between $Ca^{2+}$ concentration and operation time in case of the electrodialysis of a solution saturated with gypsum. Characteristic curve B shows that when the solution is introduced into the electrodialysis apparatus to concentrate and desalt it without any condensed phosphate, $Ca^{2+}$ concentration increase a little at an initial time of operation, and in a short time precipitation of $CaSO_4$ on the membrane faces starts to be conducted whereby $Ca^{2+}$ concentration thereafter does not change. On the other hand, the characteristic curve A shows that when electrodialysis of the gypsum solution is conducted with hexametaphosphorus acidic sodium of 30 ppm being added, $Ca^{2+}$ did not precipitate as $CaSO_4$ on the membrane faces, and the $Ca^{2+}$ concentration increased. The apparatus was disassembled after running for 24 hours, and condition of contamination of the membranes was observed. As the results the gypsum all over the membrane surfaces was precipitated in case of no addition of the condensed phosphate, but when added, precipitation of $CaSO_4$ could not be found.

Figure 9:
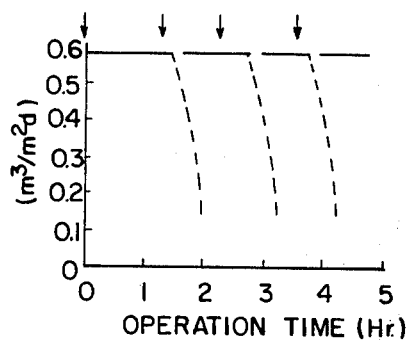
FIG. 9 is a graph showing a relation between migration amount of water and running time.

In FIG. 9 shown is a method intermittent addition of the condensed phosphate. When the hexametaphosphorus acidic sodium of 5 ppm is added in the solution saturated with $Ca^{2+}$, even if the $Ca^{2+}$ is condensed to above 400 ppm, the $Ca^{2+}$ can be masked. However, the hydrolysis of the hexametaphosphorus acidic sodium starts to be effected after about one and one half hours from the start and the masking effect of the hexametaphosphorus acidic sodium comes to be lost. Therefore, if the additional hexametaphosphorus acidic sodium of the same quantity as in first addition is added within the effective time in which the hydrolysis is not be effected, that is, urthim one and are half hours from the start; the $Ca^{2+}$ can be masked for an additional time. Thus by intermittantly adding the hexametaphosphrous acidic sodium in the waste water or solution the $Ca^{2+}$ is condensed and the operation can be run for a long time.

It goes without saying that the region B changes according to the kind of the condensed phosphate ($2 > R > 1$, $R = 1$, $1 > R > 0$), the coexistance ions such as $SO_4^{2-}$, $H^+$, $OH^-$ etc., and a liquid temperature. As mol ratio ($[SO_4^{2-}]/[Ca^{2+}]$) between $SO_4^{2-}$ and $Ca^{2+}$ become larger, the region B takes tendency to be wider, and become smaller according to the liquid temperature decreasing.

Figure 10:
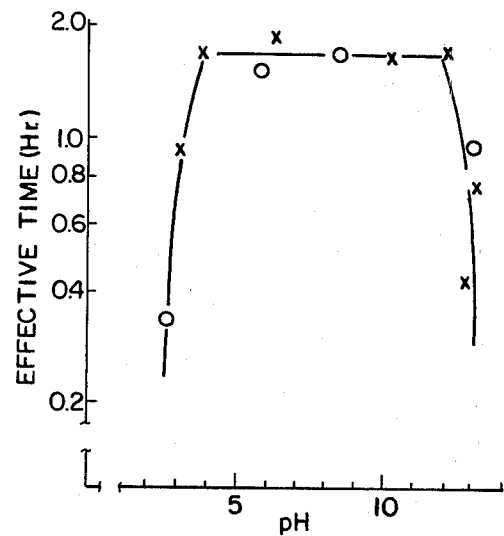
FIG. 10 is a graph showing a relation between effective time and pH value.

FIG. 10 shows an experimental result of pH influence affecting the masking effect of the condensed phosphate. The masking effective time is obtained under the experiment condition such that Graham's salt or the hexametaphosphrous acidic sodium of 5 ppm is dissolved in $CaCl_2$, $Na_2SO_4$ solution of 0.1 mol concentration, is adjusted to a predetermined pH value, and then left as it is after its agitation. The masking effect decreases abruptly outside the pH region of 4.0 to 12.0. Accordingly, pH region of the waste water or solution in which the condensed phosphate is added, is effective at the pH value between 4.0 and 12.0, but in case where the waste water or solution is introduced into the dialysis apparatus, the ion exchange membrane brings about hydrolysis at the alkaline side. Therefore, practically the pH value is preferably between 4.0 and 6.0. In FIG. 10, points X and O denote Graham's salts and the hexametaphosphrous acidic sodium, respectively.

In FIG. 11, further pH adjustment is shown, the waste water or solution is introduced into the tank 30 in which the condensed phosphate is added, the pH of the waste water or solution is adjusted to $4.0 \leq pH \leq 6.0$. The pH adjusted waste water or solution is dialyzed.

The masking effect is raised by help of the aeration.

What is claimed is:

1. A method of dialysis of solution by use of a dialysis apparatus which comprises dilution and concentration chambers which are defined by frame members and ion exchange membranes alternately arranged, comprising the steps of:
   introducing solution into each of said dilution chambers,
   adding condensed phosphate into the solution and thereafter introducing the solution with added condensed phosphate into each of the concentration chambers,
   introducing air into each of said dilution and concentration chambers from lower portions thereof to rise up between said ion exchange membranes,
   flowing diluent and concentrate in said dilution and concentration chambers out of said dilution and concentration chambers respectively, and
   discharging the air out of said dilution and concentration chambers from upper portions thereof.

2. The method as defined in claim 1, further including a step of pH adjustment of the solution in which the condensed phosphate is added before dialysis.

3. The method as defined in claim 1, wherein the pH of the solution is adjusted to the value of 4.0 to 6.0.

4. A dialysis apparatus comprising:
   a plurality of ion exchange membranes arranged vertically with predetermined intervals therebetween;
   a plurality of frame members having peripheral portions, said ion exchange membranes and said frame members arranged alternately and secured tightly at the peripheral portions to define thereby a plurality of dilution chambers and concentration chambers alternately;

first and second passage means defined in the lower portions of said frame members for introducing solution into said dilution and concentration chambers respectively;

third and fourth passage means defined in the upper portions of said frame members for discharging diluent in said dilution chambers and concentrate in said concentration chambers therefrom respectively;

a plurality of aerating conduits provided in lower portions of said dilution and concentration chambers for introducing air into each of said dilution and concentration chambers;

a plurality of air vent means provided in the upper portions of said dilution and concentration chambers for discharging air introduced in said dilution and concentration chambers out of said dilution and concentration chambers;

first tank means fluidly connected to said first and third passage means for containing diluent;

means maintaining the level of the diluent in said first tank means equal to the level of diluent in said third passage means, whereby diluent will be recirculated according to air lift; and second tank means fluidly connected to said second and fourth passage means for containing therein concentrate;

means maintaining the level of the concentration in said second tank means equal to the level of concentrate in said fourth passage means, whereby concentration will be recirculated according to air lift; and means for passing air through said aerating conduits to bubble up through said dilution and concentration chambers and discharge from said air vent means for providing the sole means for circulating solution respectively through said chambers, passage means and tank means.

5. The dialysis apparatus as defined in claim 4, further including means for adding condensed phosphate to the solution.

6. The dialysis apparatus as defined in claim 5, further including means for adjusting pH of the waste water or solution in which the condensed phosphate is added.

* * * * *